United States Patent
Majeti et al.

(10) Patent No.: US 12,120,525 B2
(45) Date of Patent: Oct. 15, 2024

(54) CONCEALING LOW POWER MOBILE DEVICE ADDRESS DURING ADVERTISEMENT

(71) Applicant: Cisco Technology, Inc., San Jose, CA (US)

(72) Inventors: Nageswara Rao Majeti, Bengaluru (IN); Sairam Sambaraju, Hyderabad (IN); Manikanteswar G. Govinda Swamy, Bengaluru (IN); Kishore Hanumansetty, Hyderabad (IN); Saravanan Radhakrishnan, Bangalore (IN); Bhavik P. Shah, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 17/447,537

(22) Filed: Sep. 13, 2021

(65) Prior Publication Data
US 2023/0084235 A1   Mar. 16, 2023

(51) Int. Cl.
*H04W 12/50* (2021.01)
*H04W 12/47* (2021.01)
*H04W 12/71* (2021.01)

(52) U.S. Cl.
CPC ........... *H04W 12/50* (2021.01); *H04W 12/47* (2021.01); *H04W 12/71* (2021.01)

(58) Field of Classification Search
CPC ..... H04W 12/50; H04W 12/47; H04W 12/71; H04W 12/02; H04W 12/06
See application file for complete search history.

(56) References Cited

U.S. PATENT DOCUMENTS

| | | | | |
|---|---|---|---|---|
| 8,769,639 | B2* | 7/2014 | Begorre | H04W 12/122 713/153 |
| 10,219,106 | B1 | 2/2019 | Lam et al. | |
| 11,381,971 | B2* | 7/2022 | Mercier | H04W 12/08 |
| 2003/0177267 | A1* | 9/2003 | Orava | H04L 63/0407 709/245 |
| 2004/0128345 | A1* | 7/2004 | Robinson | H04L 9/40 709/223 |
| 2009/0074187 | A1* | 3/2009 | Inoue | H04L 63/1458 380/270 |

(Continued)

OTHER PUBLICATIONS

Lonzetta, Angela & Cope, Peter & Campbell, Joseph & Mohd, Bassam & Hayajneh, Thaier. (2018). Security Vulnerabilities in Bluetooth Technology as Used in IoT. Journal of Sensor and Actuator Networks. dated Jul. 19, 2018, pp. 1-26.

(Continued)

*Primary Examiner* — Jinsong Hu
*Assistant Examiner* — Rui M Hu
(74) *Attorney, Agent, or Firm* — Patterson + Sheridan, LLP

(57) ABSTRACT

In one embodiment, a method is disclosed for mobile device security that includes receiving a label ID from a low power mobile device via a first access point, wherein the label ID is a randomized value that substitutes a device address of the low power mobile device during wireless communication. The method includes mapping the label ID to the device address, and transmitting the device address to the first access point, and responsive to the transmitting, causing the first access point to pair with the low power mobile device.

18 Claims, 4 Drawing Sheets

(56) References Cited

U.S. PATENT DOCUMENTS

| | | | |
|---|---|---|---|
| 2013/0024915 A1* | 1/2013 | Jones | H04L 63/083 726/5 |
| 2013/0259230 A1 | 10/2013 | Polo et al. | |
| 2013/0305332 A1* | 11/2013 | Narasimhan | H04W 36/0038 726/7 |
| 2014/0050320 A1* | 2/2014 | Choyi | H04W 12/06 380/270 |
| 2014/0171134 A1* | 6/2014 | Tseng | H04W 4/14 455/466 |
| 2014/0179233 A1* | 6/2014 | Kang | H04W 12/06 455/41.2 |
| 2014/0256262 A1* | 9/2014 | Park | H04W 12/02 455/41.2 |
| 2015/0063205 A1* | 3/2015 | Elliott | H04L 63/0421 370/328 |
| 2016/0135041 A1* | 5/2016 | Lee | H04L 45/745 726/3 |
| 2016/0269359 A1* | 9/2016 | Adrangi | H04L 61/5038 |
| 2016/0352622 A1* | 12/2016 | Gautam | H04L 45/66 |
| 2017/0013449 A1* | 1/2017 | Raman | H04W 12/06 |
| 2017/0149799 A1* | 5/2017 | Vamaraju | H04W 64/00 |
| 2017/0223754 A1* | 8/2017 | Li | H04W 12/02 |
| 2017/0257896 A1* | 9/2017 | Zong | H04L 12/189 |
| 2017/0289157 A1 | 10/2017 | Dawoud Shenouda Dawoud et al. | |
| 2017/0372600 A1* | 12/2017 | Palin | H04W 4/80 |
| 2018/0077022 A1* | 3/2018 | Van Oost | H04L 63/0876 |
| 2018/0145834 A1* | 5/2018 | Dharankar | H04W 12/10 |
| 2018/0248871 A1* | 8/2018 | Tsirkin | H04W 12/06 |
| 2018/0270728 A1* | 9/2018 | Van Oost | H04W 28/0268 |
| 2018/0324152 A1 | 11/2018 | Jarchafjian et al. | |
| 2018/0332471 A1* | 11/2018 | Zhu | H04L 63/061 |
| 2018/0349242 A1* | 12/2018 | Mathews | G06F 11/3051 |
| 2019/0081937 A1* | 3/2019 | Lu | H04L 63/061 |
| 2019/0098494 A1* | 3/2019 | Pry | H04W 12/068 |
| 2019/0135229 A1* | 5/2019 | Ledvina | H04L 63/18 |
| 2019/0215369 A1* | 7/2019 | Pry | H04W 12/50 |
| 2019/0349397 A1* | 11/2019 | Li | H04W 12/71 |
| 2019/0356485 A1 | 11/2019 | Young et al. | |
| 2019/0364424 A1* | 11/2019 | Vanderveen | H04W 12/041 |
| 2019/0380028 A1* | 12/2019 | Rasanen | H04W 12/02 |
| 2020/0275272 A1* | 8/2020 | Montemurro | H04L 63/0876 |
| 2020/0351648 A1* | 11/2020 | Fang | H04W 12/02 |
| 2021/0036988 A1* | 2/2021 | McKibben | H04W 12/06 |
| 2021/0243603 A1* | 8/2021 | Yin | H04L 9/0861 |
| 2021/0266735 A1* | 8/2021 | Hu | H04W 76/10 |
| 2021/0298095 A1* | 9/2021 | Ergen | H04L 61/50 |
| 2021/0329462 A1* | 10/2021 | Bernsen | H04W 12/02 |
| 2022/0060898 A1* | 2/2022 | Liu | H04W 12/069 |
| 2022/0167256 A1* | 5/2022 | Kneckt | H04W 12/02 |
| 2022/0232466 A1* | 7/2022 | Chen | H04L 63/0414 |
| 2023/0061284 A1* | 3/2023 | Perras | H04W 4/023 |
| 2023/0091254 A1* | 3/2023 | Lee | H04L 63/123 726/4 |
| 2023/0269219 A1* | 8/2023 | Nainar | H04W 12/108 713/168 |
| 2024/0031330 A1* | 1/2024 | Henry | H04L 61/5092 |

OTHER PUBLICATIONS

G. Celosia, M. Cunche, "Discontinued Privacy: Personal Data Leaks in Apple Bluetooth-Low-Energy Continuity Protocols," Proceedings on Privacy Enhancing Techonologies, Year: 2020, pp. 26-46.

Insight SIP, "Bluetooth Low Energy Applications Based on ISP modules," Bluetooth SMSRT, Dated Mar. 2017, pp. 1-15.

Mohammad Afaneh, "Bluetooth Addresses & Privacy in Bluetooth Low Energy," Novel Bits, dates Apr. 6, 2020.

Martin Woolley, "Bluetooth Core Specification Version 5.2 Feature Overview," Bluetooth, dated Dec. 9, 2020, pp. 1-37.

* cited by examiner

CONCEALING LOW POWER MOBILE DEVICE ADDRESS DURING ADVERTISEMENT

TECHNICAL FIELD

Embodiments presented in this disclosure generally relate to low power mobile devices (e.g., Bluetooth low energy (BLE) devices), and more specifically to security for communications between a low power mobile device and one or more access points.

BACKGROUND

In a BLE network, multiple BLE devices communicate with one or more access points. Conventionally, a BLE device broadcasts (i.e., advertises) its Bluetooth device address (BD_ADDR), which is obtained by an access point scanning for BLE device broadcasts. Once detected, the access point pairs with the BLE device using the BD_ADDR of the BLE device.

However, broadcasts from the BLE device are conventionally not encrypted and broadcast into open air, providing an opportunity for malicious actors to learn the BD_ADDR of the BLE device. This may be used to launch attacks and compromise the BLE network. In some cases, using partial BD_ADDR randomization, a portion of the random BD_ADDR may be encrypted using a pseudo random identity resolving key (IRK) that resolves to the BD_ADDR. But due to the pseudo random nature of the IRK, a malicious actor may eventually decrypt the IRK and use it to obtain the actual BD_ADDR.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
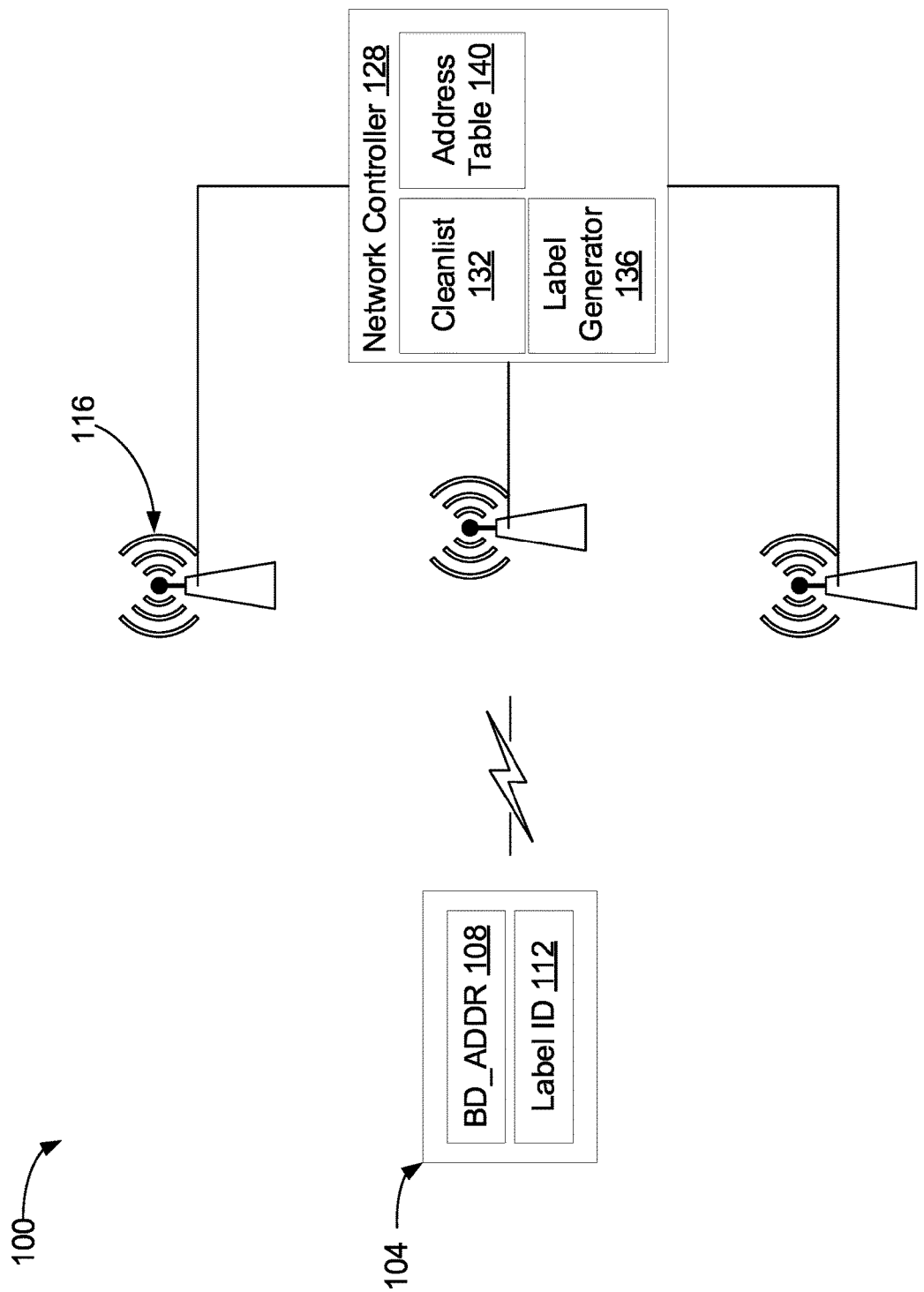
FIG. 1 depicts a BLE device network, according to certain embodiments.

According to certain embodiments a method for mobile device security is disclosed that includes receiving a label ID from a low power mobile device via a first access point, wherein the label ID is a randomized value that substitutes a device address of the low power mobile device during wireless communication, mapping the label ID to the device address, and transmitting the device address to the first access point, and responsive to the transmitting, causing the first access point to pair with the low power mobile device.

Further embodiments include a system that includes a low power mobile device comprising a label ID and a device address, a first access point, and a memory comprising computer-readable instructions. The system further includes a processor coupled to the memory and configured to read the computer-readable instructions that cause the processor to receive the label ID from the low power mobile device via the first access point wherein the label ID is a randomized value that substitutes a device address of the low power mobile device during wireless communication, map the label ID to a device address, and transmit the device address to the first access point, and responsive to the transmitting, cause the first access point to pair with the low power mobile device.

Further embodiments include logic encoded in one or more tangible media for execution and when executed operable to receive a label ID from a low power mobile device via a first access point wherein the label ID is a randomized value that substitutes a device address of the low power mobile device during wireless communication, map the label ID to a device address, and transmit the device address to the first access point, and responsive to the transmitting, causing the first access point to pair with the low power mobile device.

Example Embodiments

According to certain embodiments a low power mobile device (one example being a BLE device), may transmit its device address (e.g., a Bluetooth device address BD_ADDR) to an access point (AP). The AP in turn provides the device address to a network controller that maps the device address to a cleanlist of device addresses. For cleanlisted device addresses, in one embodiment the network controller generates a random label ID and expiry timer that are transmitted to the BLE device via the AP. In addition, the network controller stores a mapping between the device address and the label ID, to resolve the label ID to the low power mobile device's address. According to certain embodiments, the label ID is a pure random label not correlated to the device address, so that a malicious actor seeking to decrypt the label ID and acquire the device address will not be able to do so.

Once the BLE has the label ID, the label ID is then broadcast (i.e., advertised) to the access points on the network. Although a malicious actor may detect the label ID, no useful information regarding the low power device, any AP, the network controller, or other low power devices on the network may be gained, as the label ID is a random label not based on any address, protocol or messaging.

An AP that receives the label ID provides it to the network controller for resolution to the device address of the BLE device that is provided to the AP. After receipt of the device address, the AP can then pair with the low power device and commence communications that according to certain embodiments may be encrypted.

FIG. 1 depicts a BLE device network 100, according to certain embodiments. While the embodiments discussed below can apply to different types of low power networks and devices, for ease of explanation, the embodiments describe the specific example of BLE network and devices.

The BLE device network 100 includes one or more BLE devices such as BLE device 104, also referred to herein as a low power mobile device, that includes a BD_ADDR 108, also referred to as a device address herein, and a label ID 112 that comprises a label generated by a network server and according to certain embodiments, an expiry timer indicating the expiration status of the label. The generation of label ID 112 is discussed below. According to certain embodiments, the label ID 112 may be provided with the BLD device 104 by the manufacturer of the BLE device 104, and stored at a database updated by the manufacturer. According to certain embodiments, a BLE device may be part of an equipment tag, an employee ID badge, or other device that is easily transportable and associated with a person or asset for tracking location, such as within a building or group of buildings.

BLE device network 100 further includes one or more APs such as AP 116. Although three APs are shown, any number of APs may be used according to certain embodiments. The APs send and receive wireless signals to one or more BLE devices, such as BLE device 104. During an initial broadcast phase described below, AP 116 receives BD_ADDR 108 (e.g., in an encrypted or semi-encrypted form) from BLE device 104, and provides this to a network controller (described below), and receives label ID 112 from the network controller, providing the same to BLE device 104. Once the label ID 112 is received by the BLE device 104, it uses the label ID 112 in future broadcasts (advertisements) to APs until pairing is achieved for communication (e.g., of the location of BLE device 104).

BLE device network 100 further includes one or more network controllers such as network controller 128, coupled to one or more APs via a wired or wireless connection, according to certain embodiments. The network controller 128 includes a cleanlist 132 that is updated from time to time, for verifying a BLE device BD_ADDR as being allowed to communicate on the BLE device network 100. According to certain embodiments, cleanlist 132 may further include a list of APs (e.g., AP MAC addresses) that are allowed to communicate on the BLE device network 100. Network controller 128 further includes a label generator 136 that generates purely random labels that may be of a length of 48 bits, and any length label may be generated by the label generator depending on configuration settings of the network controller 128, according to certain embodiments. Because the label ID 112 generated by label generator 136 is purely random, it does not resolve to the BD_ADDR 108 of the BLE device 104, or any other device in the BLE device network 100. Network controller 128 further includes an address table 140. A label ID, such as label ID 112, is generated by the label generator 136 and mapped to a concomitant BD_ADDR 108 of the BLE device 104, with this mapping stored in the address table 140. When AP 116 receives label ID 112 from the BLE device 104, it queries the network controller 128, and in return receives the BD_ADDR 108 of the BLE device 104 to pair and initiate communications.

Figure 2:
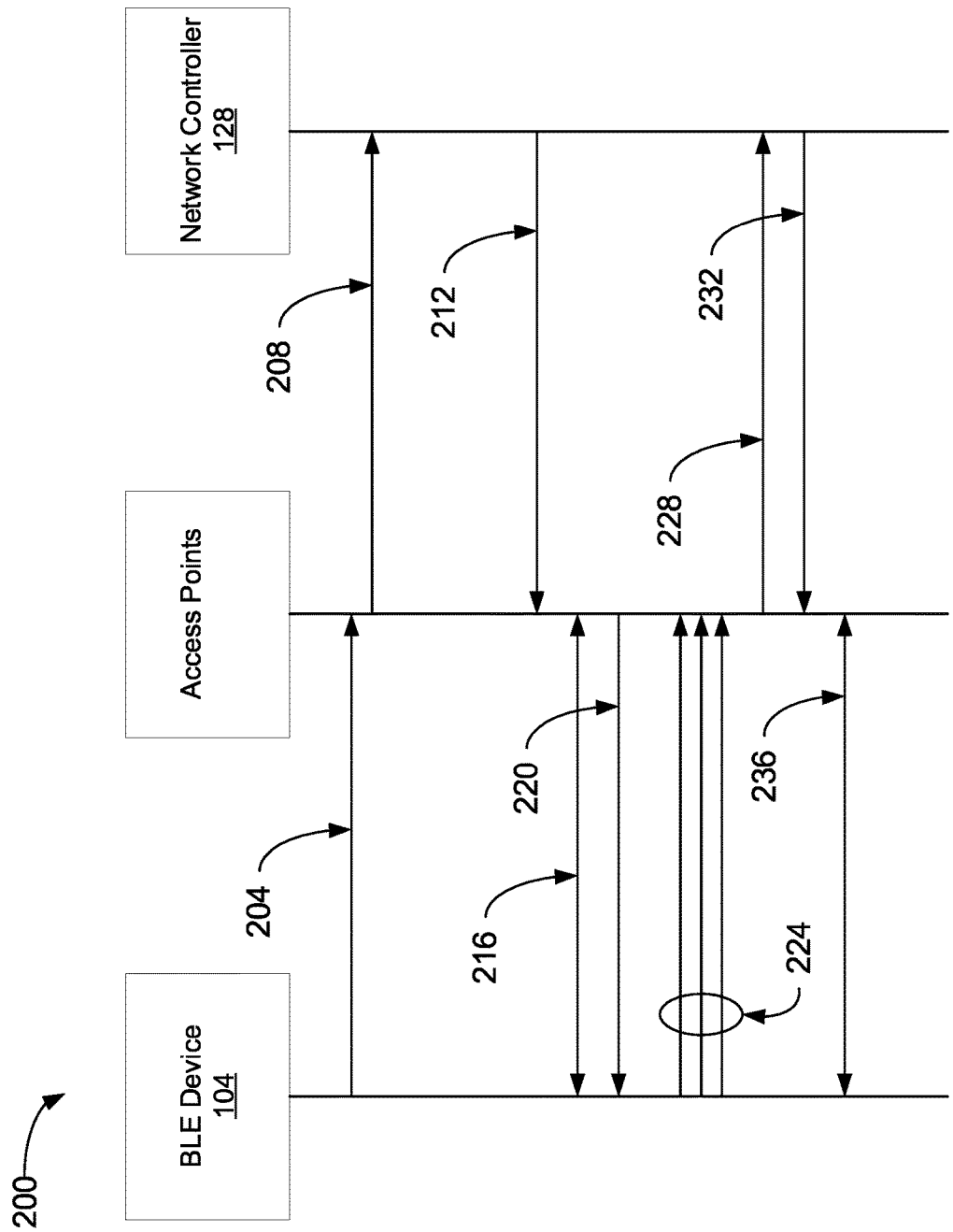
FIG. 2 depicts a timing diagram for communication on a BLE device network, according to certain embodiments.

FIG. 2 depicts a timing diagram 200 for communication on the BLE device network 100, according to certain embodiments. At arrow 204, the BLE device 104 is brought up on the network, and begins transmitting its BD_ADDR 108 (e.g., in an encrypted or semi-encrypted form) to the BLE device network 100, that is received by an access point such as AP 116. Although AP 116 is mentioned here for example purposes only, it is understood that any AP on the BLE device network 100 may be used. At arrow 208, the AP 116 provides the BD_ADDR 108 to network controller 128 that verifies the BD_ADDR against cleanlist 132 to validate that BLE device 104 is authenticated to operate on the BLE device network 100. Upon verification, the network controller generates a label such as label ID 112, that is a purely random label according to certain embodiments. The label ID 112 is mapped to the BD_ADDR 108, and the mapping is stored in address table 140. According to certain embodiments, an expiry timer is additionally generated with the label ID 112, indicating the expiration status of label ID 112. According to embodiments where the label ID 112 is provided by the manufacturer of the BLE device 104, the label ID 112 may be provided to the network controller 128 for verification, and map the label ID 112 to the BD_ADDR 108 based on the verification.

At arrow 212, the network controller 128 provides the label ID 112 to the AP 116, and at arrow 216 the AP establishes a connection with the BLE device 104. At arrow 220, the AP 116 provides the label ID 112 to the BLE device 104, that will begin broadcasting (advertising) the label ID 112 at arrow 224 to access points on the BLE device network 100. When broadcasting in this manner, BLE device 104, according to certain embodiments, does not transmit its BD_ADDR 108, thus reducing the attack surface of the BLE device network 100 to potentially malicious actors. By transmitting the label ID 112, a purely random label, a malicious actor can get no information from the label ID 112 that could lead to compromise of the BLE device 104, reducing vulnerability of the BLE network device 100.

Upon receipt of a broadcast of the label ID 112 from BLE device 104, an AP, such as AP 116, at arrow 228 provides the received label ID 112 to the network controller 128. Although the same AP reference is used here, it is understood that the AP used may be any AP on the BLE device network 100 and need not be the same AP that initially received data from the BLE device 104 at 204, above. The network controller 128, maps the label ID 112 to the BD_ADDR 108 using the address table 140, and at arrow 232 provides the BD_ADDR 108 of the BLE device 104 to AP 116. Once the BD_ADDR 108 is received by AP 116, at 236 the AP 116 may pair with BLE device 104 using BD_ADDR 108 and commence communications, which according to certain embodiments may be encrypted.

Figure 3:
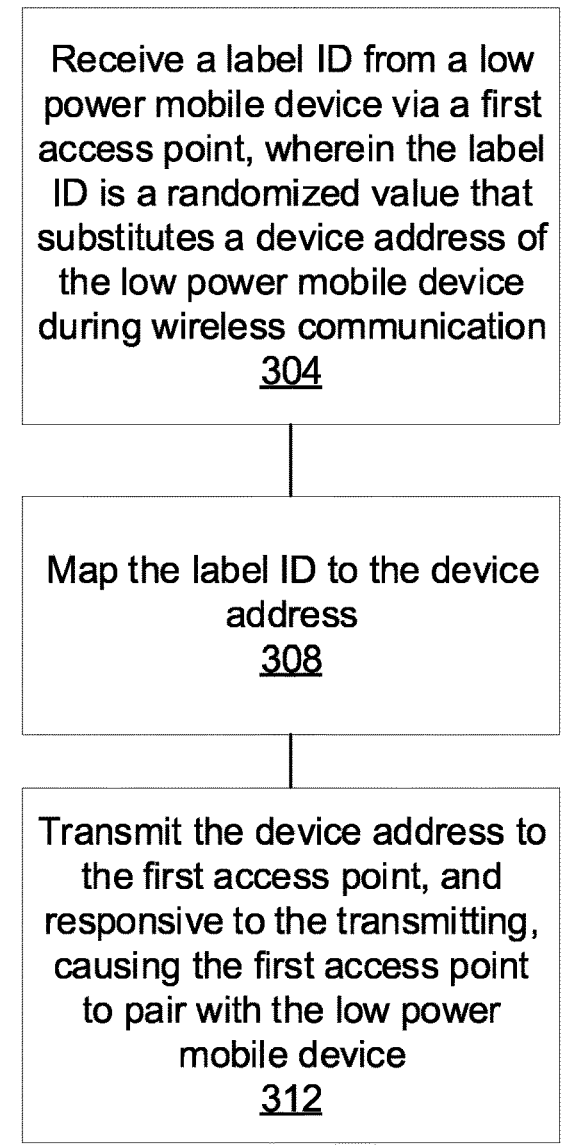
FIG. 3 depicts a method for concealing a low power mobile device address during advertisement, according to certain embodiments.

FIG. 3 depicts a method 300 for concealing a low power mobile device address during advertisement, according to certain embodiments.

At block 304, a network controller receives a receive a label ID from a low power mobile device via a first access point, wherein the label ID is a randomized value that substitutes a device address of the low power mobile device during wireless communication. As would be appreciated by one of skill in the art, although a Bluetooth implementation may be used herein as an example embodiment, embodiments may be implemented on different platforms that utilize low power mobile devices and benefit from the current disclosure, such as radio frequency identification (RFID), induction wireless, infrared wireless, ultra wideband (UWB), RF-Lite/ZIGBEE™, wifi HaLow, ZWAVE™, and the like. According to certain embodiments, the device address is a MAC address of the low power mobile device, and wherein the label ID may be a random MAC address.

At 308, the network controller maps the label ID to the device address.

At 312 the network controller transmits the device address to the first access point, and responsive to the transmitting, causing the first access point to pair with the low power mobile device. According to certain embodiments, causing the second access point to pair with the low power mobile device includes communication between the low power mobile device and the second access point using the device address as the identifier of the low power mobile device. According to certain embodiments, transmitting the device address includes transmitting the device address in an encrypted form.

According to certain embodiments, the method 300 may include the network controller receiving the device address from the low power mobile device, such as via an access point, mapping the device address to the label ID, transmitting the label ID to a second access point, and wherein transmitting the label ID to the second access point comprises communication between the low power mobile device and second access point using the label ID as an identifier of the low power mobile device. In such embodiments, causing the second access point to pair with the low power mobile device comprises communication between the low power mobile device and first access point using the device address as the identifier of the low power mobile device.

Figure 4:
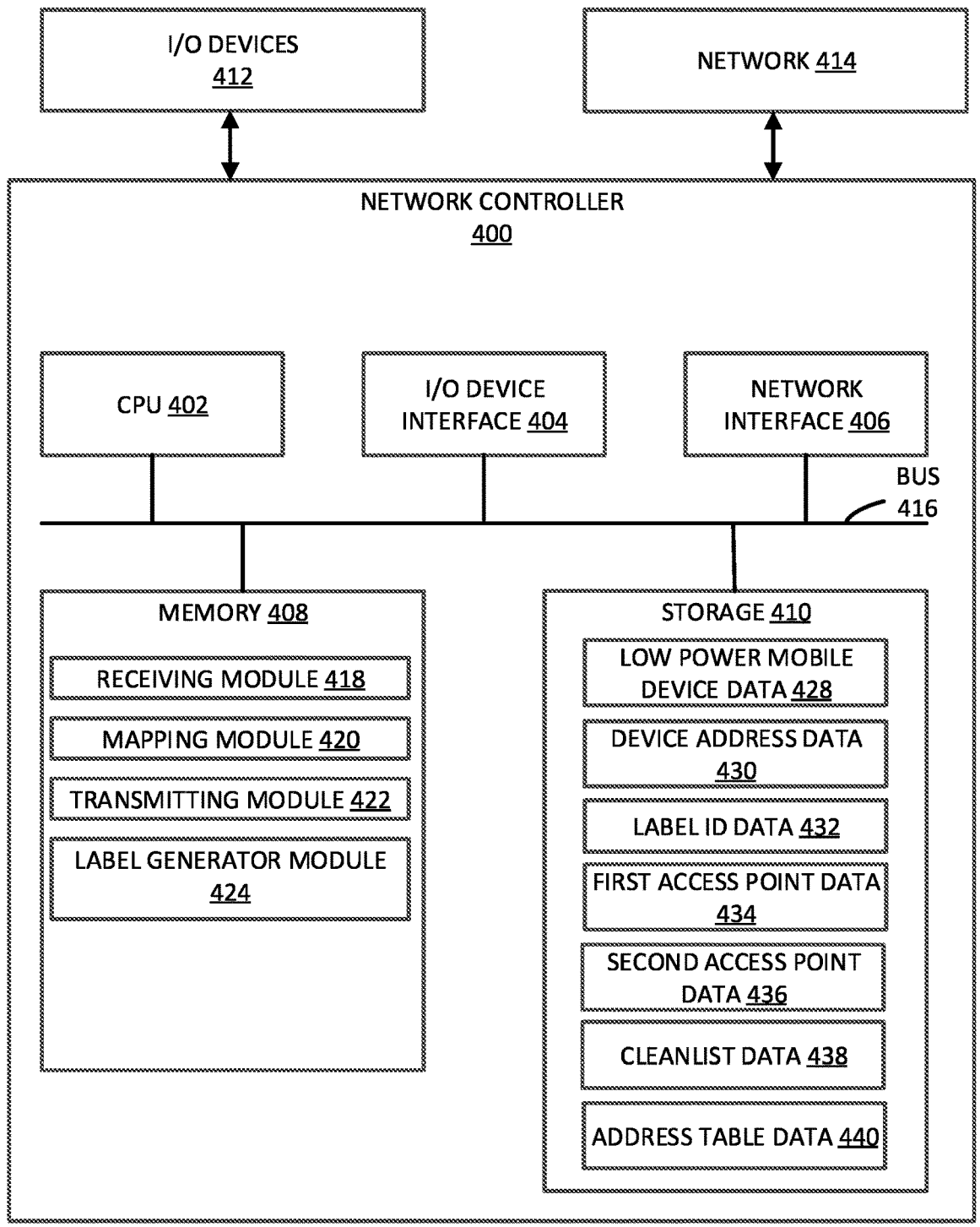
FIG. 4 depicts an example network controller that may perform methods described herein, such as the method for concealing low power mobile device address during advertisement, described with respect to FIGS. 1-3.

FIG. 4 depicts an example network controller 400 that may perform methods described herein, such as the method for concealing low power mobile device address during advertisement, described with respect to FIGS. 1-3.

Network controller 400 includes a central processing unit (CPU) 402 connected to a data bus 414. CPU 402 is configured to process computer-executable instructions, e.g., stored in memory 408 or storage 410, and to cause the network controller 400 to perform methods described herein, for example with respect to FIGS. 1-3. CPU 302 is included to be representative of a single CPU, multiple CPUs, a single CPU having multiple processing cores, and other forms of processing architecture capable of executing computer-executable instructions.

Network controller 400 further includes input/output (I/O) device(s) 412 and interface(s) 404, which allows network controller 400 to interface with input/output devices 412, such as, for example, keyboards, displays, mouse devices, pen input, and other devices that allow for interaction with network controller 400. Note that network controller 400 may connect with external I/O devices 412 through physical and wireless connections (e.g., an external display device).

Network controller 400 further includes network interface 406, which provides network controller 400 with access to external networks 416 and thereby external computing devices.

Network controller 400 further includes memory 408, which in this example includes receiving module 418, mapping module 420, transmitting module 422, and label generator module 424, for performing operations described in FIGS. 1-3.

Note that while shown as a single memory 408 in FIG. 4 for simplicity, the various aspects stored in memory 408 may be stored in different physical memories, but all accessible by CPU 402 via internal data connections such as bus 414.

Storage 410 further includes low power mobile device data 428, device address data 430, label ID data 432, first access point data 434, second access point data 436, cleanlist data 438, and address table data 440, for performing operations described in FIGS. 1-3.

While not depicted in FIG. 4, other data elements not explicitly mentioned may be included in storage 410.

As with memory 408, a single storage 410 is depicted in FIG. 4 for simplicity, but the various aspects stored in storage 410 may be stored in different physical storages, but all accessible to CPU 402 via internal data connections, such as bus 414, or external connection, such as network interface 406. One of skill in the art will appreciate that one or more elements of network controller 400 may be located remotely and accessed via a network.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for mobile device security, comprising:
   receiving an identifier reflecting a device address for a mobile device;
   verifying, based on the device address, that the mobile device is permitted to operate using a wireless communication network comprising one or more access points, comprising:
      verifying both the device address, and an address of at least one of the one or more access points, against a cleanlist of device addresses; and
   based on the verifying that the mobile device is permitted to operate using the wireless communication network, generating a label ID for the mobile device, wherein the label ID is a randomized value that substitutes for the device address of the mobile device during wireless communication on the wireless communication network;
   generating an expiry timer indicating an expiration status of the label ID;
   transmitting the label ID to the device;
   transmitting the expiry timer to the device;
      receiving the label ID from the mobile device via a first access point, of the one or more access points;
   mapping the label ID to the device address; and
   transmitting the device address to the first access point, and responsive to the transmitting, causing the first access point to pair with the mobile device.

2. The method of claim 1 wherein the device address is a MAC address of the mobile device, and wherein the label ID is a random MAC address.

3. The method of claim 1 further comprising:
   receiving the device address from the mobile device;
   mapping the device address to the label ID;
   transmitting the label ID to a second access point; and
   wherein transmitting the label ID to the second access point comprises communication between the mobile device and second access point using the label ID as an identifier of the mobile device.

4. The method of claim 3 wherein causing the second access point to pair with the mobile device comprises communication between the mobile device and first access point using the device address as the identifier of the mobile device.

5. The method of claim 4 wherein transmitting the label ID comprises transmitting the label ID in an encrypted form.

6. The method of claim 1, further comprising
   determining to encrypt the device address for the mobile device, while leaving the label ID in unencrypted form, for communication with the mobile device using the wireless communication network comprising the one or more access points.

7. The method of claim 1, wherein the mobile device is a low power mobile device.

8. The method of claim 7, wherein the low power mobile device is a Bluetooth® low energy mobile device.

9. A system comprising:
   a mobile device comprising a label ID and a device address;
   a first access point;
   one or more memories comprising computer-readable instructions; and
   one or more processors coupled to the one or more memories and configured to read the computer-readable instructions that cause any combination of the one or more processors to perform operations comprising:
      receiving an identifier reflecting a device address for a mobile device;
      verifying, based on the device address, that the mobile device is permitted to operate using a wireless communication network comprising one or more access points, comprising:
         verifying both the device address, and an address of at least one of the one or more access points, against a cleanlist of device addresses;
      based on the verifying that the mobile device is permitted to operate using the wireless communication network, generating a label ID for the mobile device wherein the label ID is a randomized value that substitutes for the device address of the mobile device during wireless communication on the wireless communication network;

generating an expiry timer indicating an expiration status of the label ID;

transmitting the label ID to the device;

transmitting the expiry timer to the device;

receiving the label ID from the mobile device via a first access point, of the one or more access points;

mapping the label ID to a device address; and transmitting the device address to the first access point, and responsive to the transmitting, causing the first access point to pair with the mobile device.

10. The system of claim 9 wherein the device address is a MAC address of the mobile device, and wherein the label ID is a random MAC address.

11. The system of claim 9 further comprising:

a second access point;

wherein the operations further comprise:

receiving the device address from the mobile device;

mapping the device address to a label ID;

transmitting the label ID to the second access point, wherein the second access point transmits the label ID to the mobile device; and wherein transmitting the label ID to a first access point comprises communication between the mobile device and first access point using the label ID as an identifier of the mobile device.

12. The system of claim 11 wherein pairing with the mobile device comprises communication between the mobile device and access point using the device address as the identifier of the mobile device.

13. The system of claim 12 wherein transmitting the label ID comprises transmitting the label ID in an encrypted form.

14. A non-transitory computer program product comprising:

one or more non-transitory computer readable media containing, in any combination, computer program code that, when executed by operation of any combination of one or more processors, performs operations comprising:

receiving an identifier reflecting a device address for a mobile device;

verifying, based on the device address, that the mobile device is permitted to operate using a wireless communication network comprising one or more access points comprising:

verifying both the device address, and an address of at least one of the one or more access points, against a cleanlist of device addresses;

based on the verifying that the mobile device is permitted to operate using the wireless communication network, generating a label ID for the mobile device wherein the label ID is a randomized value that substitutes for the device address of the mobile device during wireless communication on the wireless communication network;

generating an expiry timer indicating an expiration status of the label ID;

transmitting the label ID to the device;

transmitting the expiry timer to the device;

receiving the label ID from the mobile device via a first access point, of the one or more access points;

mapping the label ID to a device address; and transmitting the device address to the first access point, and responsive to the transmitting, causing the first access point to pair with the mobile device.

15. The non-transitory computer program product of claim 14 wherein the device address is a MAC address of the mobile device, and wherein the label ID is a random MAC address.

16. The non-transitory computer program product of claim 14 wherein transmitting the label ID to the first access point comprises communication between the mobile device and first access point using the label ID as an identifier of the mobile device.

17. The non-transitory computer program product of claim 16, the operations further comprising:

receiving the device address from mobile device;

mapping the device address to the label ID;

transmitting the label ID to a second access point, wherein the second access point transmits the label ID to the mobile device; and wherein causing the first access point to pair with the mobile device comprises communication between the mobile device and first access point using the device address as the identifier of the mobile device.

18. The non-transitory computer program product of claim 17 wherein transmitting the label ID comprises transmitting the label ID in an encrypted form.

* * * * *